United States Patent [19]

Klemann et al.

[11] Patent Number: 5,093,142
[45] Date of Patent: Mar. 3, 1992

[54] ALCOHOL AMINE ESTERS AS LOW CALORIE FAT MIMETICS

[75] Inventors: Lawrence P. Klemann, Somerville; John W. Finley, Whippany; Anthony Scimone, Cedar Grove, all of N.J.

[73] Assignee: Nabisco Brands, Inc., Parsippany, N.J.

[21] Appl. No.: 409,381

[22] Filed: Sep. 19, 1989

[51] Int. Cl.$^5$ .................... A23L 1/307; C09F 5/00
[52] U.S. Cl. .................... 426/531; 260/404; 260/404.5; 426/601; 426/611; 426/804
[58] Field of Search ............. 426/601, 611, 804, 531; 260/404, 404.5

[56] References Cited

U.S. PATENT DOCUMENTS

| | | | |
|---|---|---|---|
| 519,980 | 5/1894 | Winter . | |
| 2,520,356 | 8/1950 | Bishop | 117/134 |
| 2,924,528 | 2/1960 | Barsky et al. | 99/118 |
| 2,962,419 | 11/1960 | Minich | 167/81 |
| 2,993,063 | 7/1961 | Alsop et al. | 260/410.6 |
| 3,264,188 | 8/1966 | Gresham | 167/84 |
| 3,495,010 | 2/1970 | Fossel | 424/312 |
| 3,579,548 | 5/1971 | Whyte | 260/410.7 |
| 3,600,186 | 8/1971 | Mattson et al. | 99/1 |
| 3,637,774 | 1/1972 | Babayan et al. | 260/410.6 |
| 3,818,089 | 6/1974 | Bayley et al. | 429/9 |
| 3,876,794 | 4/1975 | Rennhard | 426/152 |
| 4,005,195 | 1/1977 | Jandacek | 424/180 |
| 4,136,054 | 1/1979 | Petzold et al. | 252/301.21 |
| 4,243,802 | 1/1981 | Landoll | 536/91 |
| 4,258,055 | 3/1981 | Lietti et al. | 424/283 |
| 4,304,768 | 12/1981 | Staub et al. | 424/180 |
| 4,508,746 | 4/1985 | Hamm | 426/601 |
| 4,631,196 | 12/1986 | Zeller | 426/580 |
| 4,663,379 | 5/1987 | Fischer et al. | 524/376 |

FOREIGN PATENT DOCUMENTS

| | | |
|---|---|---|
| 1106681 | 8/1981 | Canada . |
| 205273 | 12/1986 | European Pat. Off. . |
| 233856 | 8/1987 | European Pat. Off. . |
| 254547 | 1/1988 | European Pat. Off. . |
| 1030309 | 2/1956 | Fed. Rep. of Germany . |

OTHER PUBLICATIONS

Chemical Abtracts 106(10), 68304g, 3/1987.
Chemical Abstracts, 107(4), 24753b, 7/1987.
Chemical Abstracts, 99(8), 55382a.
Lagenscheidt's New College German Dictionary, Berlin 1973, pp. 450 and 617.
The Merck Index, 11th ed., Rahway, N.J. 1989, pp. 290, 662, 663, 867 and 868.
Bachur, N. R., et al., 240 J. Biol. Chem. 1019 (1965).
Blair, F. I., and Faucher, L., 8 Bull. Am. Soc. Hosp. Pharm. 245 (1951).
Booth, A. N., et al., 40 J. Amer. Oil Chem. Soc., 551 (1963).
Colodzin, M., et al., 10 Biochem. Biophys. Res. Commun., 165 (1963).
Goodman & Gilman's Pharmacological Basis of Therapeutics, 7th ed., MacMillan Pub. Co., N.Y., (1985), pp. 1002-1003.
Hamm, D. J., 49 J. Food Sci., 419 (1984).
Haumann, B. J., 63 J. Amer. Oil Chem. Soc., 278 (1986).
LaBarge, R. G., 42 Food Tech., 84 (1988).
Lapworth, A., et al., 13 J. Biol. Chem., 296 and 301 (1919).
Silverstein, R. M., et al., 32 J. Amer. Oil Chem. Soc., 354 (1955).
Smith, E. L., et al., Principals of Biochemistry: Mammalian Biochemistry, McGraw Hill, N.Y., p. 263 (1983).
Stryker, W. A., 31 Arch. Path., 670 (1941).

Primary Examiner—Donald E. Czaja
Assistant Examiner—Evan Federman

[57] ABSTRACT

Alcohol amine ester derivatives are disclosed as fat mimetic compounds for reduced calorie food compositions. These compounds have a nitrogen to which is attached at least one fatty acid ester or ester derivative via an alkylene bridge and at least one other fatty group which can be attached either as a second fatty acid ester via an alkylene bridge, or in amine or amide linkage. These compounds can be represented by the following formula:

$$(R-(CO)_r)_m-NH_n(-A-O-\overset{\overset{\displaystyle O}{\|}}{C}-R)_q$$

where m, n, q and r are integers, A is $-(CH_2)_2-$, $-(CH_2)_3-$, or $-CH_2CH(CH_3)-$, and the R groups are, independently, $C_1$ to $C_{29}$ aliphatic, ester or ether groups. Preferred compounds are partially digestible and have $m+q=3$, or three R groups.

47 Claims, No Drawings

ALCOHOL AMINE ESTERS AS LOW CALORIE FAT MIMETICS

BACKGROUND OF THE INVENTION

This invention relates to the use of alcohol amine ester derivatives as edible, preferably partially digestible, synthetic fat replacements in food and pharmaceuticals. These compounds have a nitrogen to which is attached at least one fatty group in ester linkage via an alkylene bridge and at least one other fatty group either attached with a second ester bond via an aklylene bridge, or in amine or amide linkage.

Since fats make up 40 to 45% of the diet and provide nine calories per gram compared to four calories per gram provided by protein or carbohydrates, major research efforts toward reduction of caloric intake for medical or health reasons have focused on ways to produce food substances that provide the same functional and organoleptic properties as fats, but not the calories.

A major strategy for developing low calorie replacement fats has been to structurally re-engineer natural triglycerides in such a way as to retain their conventional functional properties in foods, while removing their susceptibility toward hydrolysis or subsequent absorption during digestion. To this end, the fatty acids attached to glycerol have been replaced with alternate acids (U.S. Pat. No. 3,579,548 to Whyte); groups have been inserted between the fatty acids and the glycerol backbone ("propoxylated glycerols", Eur. Pat. Ap. No. 254,547 to White and Pollard); the ester linkages have been replaced by ether linkages (U.S. Pat. No. 3,818,089 to Bayley and Carlson, and Can. Pat. No. 1,106,681 to Trost); the ester linkages have been reversed (U.S. Pat. No. 4,508,746 to Hamm); and the glycerol moeity has been replaced with an alternate alcohol (e.g., ethylene glycol in U.S. Pat. No. 2,924,528 to Barskey et al., and U.S. Pat. No. 2,993,063 to Alsop and Carr).

A second major approach to the development of a low calorie fat replacement has been to explore or synthesize nonabsorbable polymeric materials structurally unlike triglycerides, but having physical properties similar to edible fat. Mineral oil was disclosed as early as 1894 (U.S. Pat. No. 519,980 to Winter), and, more recently, polydextrose (U.S. Pat. No. 4,631,196 to Zeller), polyglucose and polymaltose (U.S. Pat. No. 3,876,794 to Rennhard), polysiloxane (Eur. Pat. Ap. No. 205,273 to Frye), jojoba wax (W. Ger. Pat. No. 3,529,564 to Anika), and polyethylene polymers (E. Ger. Pat. No. 207,070 to Mieth, et al.) have been suggested.

A third major strategy combines the first two. Rather than restructure triglyceride molecules or find a substitute structurally very dissimilar, this approach explores the use of various polyol esters, compounds which have numbers of fatty acid groups in excess of the three in conventional fat triglycerides, as nonabsorbable fat replacements. Fully esterified sugar alcohols were suggested as fat replacements during World War I (notably mannitol, Lapworth, A., and Pearson, L. K., and Haliburton, W. D., et al., 13 *J. Biol. Chem.* 296 and 301 (1919)); Minich suggested esterifying pentaerythritol, a tetrahydric neopentyl sugar alcohol which can be formed from pentaerythrose, in 1961 (U.S. Pat. No. 2,962,419); and the Southern and Western Regional Research Laboratories of the U.S.D.A. investigated the feasibility of using amylose esters as new-type fats during the 1960's (see Booth, A. N., and Gros, A. T., 40 *J. Amer. Oil Chem. Soc.* 551 (1963) and the references cited therein). More recently, sucrose polyesters have been suggested (U.S. Pat. No. 3,600,186 to Mattson and Volpenhein). The caloric availability and digestibility of a series of dimeric and polymeric glycerides including diglyceride esters of succinic, fumaric, and adipic acids, and polymeric fats from stearic, oleic and short-chain dibasic acids were assessed by the U.S.D.A. group cited supra, and polyglycerol esters have since been suggested (U.S. Pat. No. 3,637,774 to Babayan and Lehman).

Nondigestible or nonabsorbable triglyceride analogues, polyol esters, and polymeric materials have proved disappointing as fat replacements when tested in feeding trials, where gastrointestinal side effects occurred, in some cases so extreme that frank anal leakage was observed (for recent reviews, see Hamm, D. J., 49 *J. Food Sci.* 419 (1984), Haumann, B. J., 63 *J. Amer. Oil Chem. Soc.* 278 (1986), and LaBarge, R. G., 42 *Food Tech.* 84 (1988)). Some nondigestible fats act as a laxative and are expelled from the body, eliciting foreign body reactions like those early documented for mineral oil (Stryker, W. A., 31 *Arch. Path.* 670 (1941), more recently summarized in Goodman and Gilman's *Pharmacological Basis of Therapeutics*, 7th ed., Macmillan Pub. Co., N.Y. 1985, pp. 1002-1003). Polyglycerol and polyglycerol esters, for example, suggested as fat replacements supra, have been have been suggested for use as fecal softening agents as well (U.S. Pat. No. 3,495,010 to Fossel). A number of remedies have been recommended to combat the anal leakage observed when sucrose polyesters are ingested (e.g., employing cocoa butters, U.S. Pat. No. 4,005,195 to Jandacek, or incorporating saturated fatty groups, Eur. Pat. Ap. No. 233,856 to Bernhardt), and dietary fiber preparations have been incorporated into polysaccharide and/or polyol-containing foodstuffs to help inhibit the diarrheal effect (U.S. Pat. No. 4,304,768 to Staub et al.).

SUMMARY OF THE INVENTION

An object of the present invention is to provide a fat mimetic having substantially fewer calories than normal fat. It is another object of the present invention to provide a fat replacement more compatible with normal digestion. More particularly, it is an object of the present invention to provide a more digestible fat replacement which can minimize or avoid laxative side effects. In the preferred embodiment of this invention, it is a further object to provide a partially digestible fat replacement which may, if desired, be engineered to provide essential or desirable fatty acids.

These and other objects are accomplished by the present invention, which describes alcohol amine ester derivatives comprising a new class of edible synthetic fat replacements, methods of using them, and food compositions employing them. These compounds have a nitrogen to which is attached at least one faty group via an alkylene bridge and at least one other fatty group attached either in a second ester bridge via an alkylene bridge, or in amine or amide linkage, and may be described by the formula:

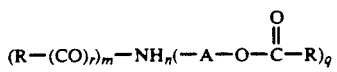

where

A is —(CH₂)₂—, —(CH₂)₃—, or —CH₂CH(CH₃)—,
m=0 to 2,
n=0 to 1,
q=1 to 3 (independently),
r=0 to 1 (independently),
with the proviso that m+q≧2, and
each R is, independently, a $C_1$ to $C_{29}$ aliphatic group, a $C_2$ to $C_{29}$ ether group of the formula R'—O—R"—, or a $C_2$ to $C_{29}$ ester group of the formula R"—O—(CO)—R'— or R'—(CO)—O—R"—, where R'— and R"— are, independently, aliphatic groups.

Preferred compounds are partially digestible.

DETAILED DESCRIPTION OF THE INVENTION

Ethanolamine is a major component of phospholipids, being present primarily as the basic portion of phosphatidylethanolamine, present in nervous tissue (comprising 15.6% of human myelin, 14.9% of white matter, 22.7% of gray matter, and 17.5% of peripheral nerve myelin, Smith, E. L., et al., *Principles of Biochemistry: Mammalian Biochemistry*, McGraw-Hill, New York, 1983, page 263) and blood (15 to 16% of erythrocyte membrane and 0 to 30% of plasma, Smith, supra at 4 and 74). Fatty acid amides of ethanolamine have also been isolated in small concentrations from mammalian brain, liver, skeletal muscle, and from egg yolks (Colodzin, M., et al. 10 *Biochem. Biophys. Res. Commun.* 165 (1963) and Bachur, N. R., et al., 240 *J. Biol. Chem.* 1019 (1965)).

Ethanolamine amides from natural sources are structurally distinct from other alcohol amine esters, notably triethanolamine fatty acid esters, which have been synthesized for use outside the food industry (e.g., to inhibit the corrosion of metals, U.S. Pat. No. 2,520,356 to Bishop; to treat textiles, U.S. Pat. No. 4,136,054 to Petzold and Waltenberger; to plasticize vinyl resins, Silverstein, R. M., et al. 32 *J. Amer. Oil Chem. Soc.* 354 (1955); to test cellulose derivatives, U.S. Pat. No. 4,243,802 to Landoll; and to emulsify dispersions in the production of surface coating binders, U.S. Pat. No. 4,663,379 to Fisher et al.). The lower esters have also been suggested as surfactants for pharmaceutical preparations (U.S. Pat. No. 3,264,188 to Gresham and U.S. Pat. No. 4,258,055 to Lietti and Bonati) and, less commonly, for foods prepared for medicinal purposes (reported for lard emulsions, Blair, F. I., and Faucher, L., 8 *Bull. Am. Soc. Hosp. Pharm.* 245 (1951); see also W. Ger. Pat. No. 1,030,309 to Brasseler and Speh (1958), which suggests using the esters as defoaming agents in gelatin and sugar beet factory solutions).

This invention is based upon the finding that triethanolamine fatty acid esters and other alcohol amine ester derivatives are useful as fat mimetic compounds for reduced calorie food compositions. These compounds have a nitrogen to which is attached at least one fatty group in ester linkage via an alkylene bridge and at least one other fatty group attached either with a second ester bond via an alkylene bridge, or in amine or amide linkage, and can be represented by the following general formula:

where
A is —(CH₂)₂—, —(CH₂)₃—, or —CH₂CH(CH₃)—,
m=0 to 2,
n=0 to 1,
q=1 to 3 (independently),
with the proviso that m+q≧2,
r=0 to 1 (independently), and
each R is, independently, a $C_1$ to $C_{29}$ aliphatic group, a $C_2$ to $C_{29}$ ether group of the formula R'—O—R"—, or a $C_2$ to $C_{29}$ ester group of the formula
R"—O—(CO)—R'— or R'—(CO)—O—R"—, where R'— and R"— are, independently, aliphatic groups.

Preferred compounds have n=0 and m+q=3. Three classes of preferred compounds may be depicted by the formulae

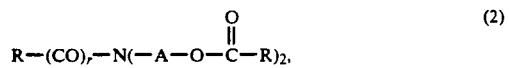   (1)

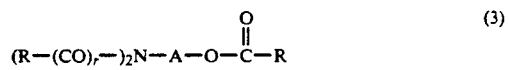   (2)

and (R—(CO)ᵣ—)₂N—A—O—C(=O)—R   (3)

where
A is —(CH₂)₂—, —(CH₂)₃—, or —CH₂CH(CH₃)—
r is, independently, 0 to 1, and
each R is, independently, as defined above.

Thus, the compounds of this invention comprise a nitrogen atom to which are attached at least one, but as many as three, aliphatic, ester or ether fatty groups (R) in ester linkage with intervening alkylene groups, and 0 to 2 other fatty groups either in amine linkage (wherein r=0 and R is linked directly to the nitrogen) or amide linkage (wherein r=1, so that R is attached to the nitrogen with an intervening carbonyl, —(CO)—, group to form an N-acyl derivative).

The compounds of this invention all have at least one fatty group, R, attached in ester linkage and at least one other fatty group, R, attached either in ester, amide or amine linkage for a minimum total of two fatty groups (m+q) in the general formula, supra). These compounds may also have one hydrogen attached to the nitrogen, i.e., n=1. Preferred compounds have three fatty groups: three R groups attached in ester linkage with intervening alkylene groups, i.e., q=3 in the general formula, alternative (1) supra; two R attached in ester linkage with intervening alkylene groups and one R attached in amine or primary amide linkage, i.e., m=1 and q=2, alternative (2) supra; or one R attached in ester linkage with intervening alkylene groups and two R attached in amine, primary amide or secondary amide linkage, i.e., m=2 and q=1, alternative (3) supra. These three types of compounds have no hydrogen attached to the nitrogen, i.e., n=0.

The compounds of this invention are generally derived from alkanolamines. Compounds of this invention include, but are not limited to, fatty acid esterified triethanol and tripropanol amine; fatty acid N-acylated diethanol and dipropanol amine fatty acid diesters; and fatty acid N-diacylated ethanol and propanol amine fatty acid esters. The compounds of this invention also include, but are not limited to, triethanolamine fatty acid triesters; N-alkyl diethanol and dipropanol amine fatty acid diesters; and N-dialkyl ethanol and propanol amine fatty acid esters.

The alkylene groups, A, may be ethylene (—CH$_2$—CH$_2$—), propylene (—CH(CH$_3$)—CH$_2$—, or normal propylene (—CH$_2$—CH$_2$—CH$_2$—).

The fatty groups R may be the same or different, and may comprise a mixture of substituents. The R groups may be aliphatic groups, ether groups of the formula R'—O—R"—, or ester groups of the formula R"—O—(CO)—R'— or R'—(CO)—O—R"—, where R'— and R"— are aliphatic groups, provided that the sum of the number of carbon atoms in R' and R" be 2 to 29. R, R', and R" may be saturated or unsaturated, with linear or branched chains. By an "aliphatic" group is meant a monovalent aliphatic radical derived from an aliphatic hydrocarbon by the removal of a hydrogen.

Fatty groups R may be derived from fatty acids. The term "fatty acid" used here means an organic fatty acid of the formula RCOOH containing 2 to 30 carbons, and may be synthetic or natural, saturated or unsaturated, with straight or branched chains. Examples of fatty acids are acetic, propionic, butyric, caproic, caprylic, pelargonic, capric, undecanoic, lauric, myristic, palmitic, stearic, arachidic, behenic, oleic, linoleic, linolenic, eleostearic, and arachidonic acids. Mixtures of fatty acids may also be used, such as those derived from non-hydrogenated, partially hydrogenated or hydrogenated soybean, safflower, sunflower, sesame, peanut, corn, olive, rice bran, canola, babassu nut, coconut, palm kernel, cottonseed, palm, butter, or marine oils, or plant waxes such as jojoba. Specific fractions of natural or processed oils or waxes may also be used.

R may also be an ester derivative of the formula R"—O—(CO)—R'— or R'—(CO)—O—R"—, with the ester bond in either direction. Thus, R may be a dicarboxylate-extended fatty group. By "dicarboxylate-extended" fatty group is meant a group formed from the reaction of fatty alcohols with dicarboxylic acids, such as, for example, malonic, succinic, glutaric or adipic acid. The resulting malonyl, succinyl, glutaryl or adipoyl fatty R groups are, structurally, aliphatic alcohols with their chains extended by the radicals —OC—CH$_2$—CO— (malonyl), —OC—(CH$_2$)$_2$—CO— (succinyl), —OC—(CH$_2$)$_3$—CO— (glutaryl), —OC—(CH$_2$)$_4$—CO— (adipoyl), and the like. Thus, if a fatty alcohol is denoted by R"OH, a malonyl-extended fatty ester group R would be R"—O—(CO)—CH$_2$—, a succinyl-extended fatty ester group R would be R"—O—(CO)—(CH$_2$)$_2$—, a glutaryl-extended fatty group would be R"—O—(CO)—(CH$_2$)$_3$— and so forth. Formulae used herein include isomeric variations.

R may also be an ester derivative that is an hydroxycarboxylic acid-extended fatty group, with the ester bond reversed as compared to dicarboxylate-extended groups. By an "hydroxycarboxylic acid-extended fatty group" is meant a group formed from the reaction between a fatty acid and the hydroxyl group of a hydroxycarboxylic acid, such as, for example, one in the lactic acid series such as glycolic (hydroxyacetic, CH$_2$OH—COOH), hydracrylic (3-hydroxypropanoic acid, CH$_2$OH—CH$_2$—COOH), hydroxybutanoic acid (4-hydroxybutanoic, CH$_2$OH—(CH$_2$)$_2$—COOH, or the 2- or 3- isomer), hydroxypentanoic acid (5-hydroxypentanoic, CH$_2$OH—(CH$_2$)$_3$—COOH, or the 2-, 3-, or 4- isomer), and so forth. Thus, if a fatty acid is denoted by R'COOH, a glycolic-extended fatty group R would be denoted R'—(CO)—O—CH$_2$—, a hydracrylic-extended fatty group R would be denoted R'—(CO)—O—(CH$_2$)$_2$—, and so forth. Ester side chains of this type may also be derived from hydroxy fatty acids (e.g., ricinoleic or hydroxystearic acids) having an acylated hydroxyl group. An acetyl ricinoleoyl R group would, for example, have the formula —(CH$_2$)$_7$—CH=CHCH$_2$—CH(O(CO)CH$_3$)—(CH$_2$)$_5$CH$_3$.

R may also be an ether group having 2 to 29 carbon atoms of the formula R'—O—R"—, with R' and R" as defined above, that is, an oxaalkyl chain having an ether group (—O—) anywhere in the chain. Ether R derivatives may be derived by using etheric carboxylic acids as acylating agents.

The R groups will be selected to provide a discernible fatty character in the compounds. Thus, most of the R groups have 3 or more carbon atoms, with a percentage containing 3 to 23 (derived from acids having 4 to 24 carbons), more narrowly 9 to 19, and even more narrowly, 15 to 17 carbon atoms. Preferred fat mimetics can have an array of R groups selected to include 95% having 13 to 17 carbon atoms. In one embodiment, the R groups should predominantly be in the range of 13 to 17 carbon atoms and be saturated. In another embodiment, the R groups should be predominantly in the range of 15 to 17 carbon atoms and be unsaturated (with a preponderance of monounsaturated groups).

The choice, number and arrangement of R groups attached to the nitrogen will affect the biological as well as physical properties of the compound. Where, by virtue of any of these factors, the R groups are metabolized, the caloric value of the compound will increase. Among the preferred compounds are those which are partially digestible and contribute 0.5 to 8.5 kcal/gram, desirably 1.0 to 6.0 kcal/gram, upon being metabolized. For some applications, compounds having approximately a third or less of the calories of natural triglyceride fat are particularly desirable.

Thus, in the preferred class of compounds, the R groups exhibit differential reactivity on digestion. This results not only in the controlled and limited availability of effective caloric value, but also the selective conversion of the fat mimetic to a product or intermediate with a less oil-like nature. The more readily digestible aliphatic residue can be a highly desirable essential acid or a nutritionally advantageous carboxylic acid such as oleic, linoleic, linolenic, or eicosapentaenoic acids, as well as low molecular weight carboxylic acids (e.g., acetic, propionic, or butyric acids) which would limit caloric delivery and provide additional ability to control functionality.

As with natural triglycerides, the more readily digestible residue can, alternatively, be a fatty acid having beneficial attributes, such as, for example, those associated with conjugated linoleic acid isomers. The product of such a controlled digestive process may be said to have decreased hydrophobicity, and correspondingly increased hydrophilicity, relative to its fat mimetic precursor. Such a product of a process of controlled digestion would tend to have not only decreased oiliness, but also increased ability to function as an emulsifier. Such a controlled digestion product will be less prone to exist in the GI tract as a persistent oil compared with substances taught in the prior art. Ideally, the enhanced emulsifying capacity of the enzymatic cleavage product derived from compositions of the invention would actually be an aid to digestion, substantially overcoming a major problem which has heretofore limited the widespread use and development of highly desirable low calorie synthetic fats and oils in foods and food preparation.

The alcohol amine ester derivatives of this invention may be incorporated either alone, or in combination with another fat and/or fat mimetic, into any food composition or used in conjunction with any edible material. The term "edible material" is broad and includes anything edible whether or not intended for nutrition, i.e., it can be an additive such as an antioxidant for fats or oils, an antispatter agent, and emulsifier, a chewing gum or coating component, a cosmetic ingredient, or other minor functional ingredient. Representative of edible materials which can contain the fat mimetic compounds of this invention in full or partial replacement of natural fat are: frozen desserts, e.g., sherbet, ice cream, ices, or milk shakes; puddings and pie fillings; margarine substitutes or blends; flavored bread or biscuit spreads; mayonnaise; salad dressings; filled dairy products such as filled cream or filled milk; dairy or non-dairy cheese spreads; coffee lighteners, liquid and dried; flavored dips; frying fats and oils; reformed and comminuted meats; meat substitutes or extenders; pet foods; whipped toppings; compound coatings; frostings and fillings; cocoa butter replacements or blends; candy, especially fatty candies such as those containing peanut butter or chocolate; chewing gum; bakery products, e.g., cakes, breads, rolls, pastries, cookies, biscuits, and savory crackers; mixes or ingredient premixes for any of these; as well as flavor, nutrient, drug or functional additive delivery systems.

The following is a list of representative, but not limiting, examples of specific alcohol amine ester derivatives of this invention:

A) Fatty acid esters of diethanol and dipropanol amines and triethanol and tripropanol amines having the general formula:

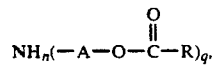

where
A is $-(CH_2)_2-$, $-(CH_2)_3-$, or $-CH_2-CH(CH_3)-$
N = 0 or 1,
q = 2 to 3, and
each R is, independently, a $C_1$ to $C_{29}$ aliphatic group, a $C_2$ to $C_{29}$ ether group of the formula $R'-O-R''-$, or a $C_2$ to $C_{29}$ ester group of the formula $R''-O-(CO)-R'-$ or $R'-(CO)-O-R''-$, where $R'-$ and $R''-$ are, independently, aliphatic groups.
Example structures of this class of alcohol amine derivatives include (1) Diethanolamine Dioleate

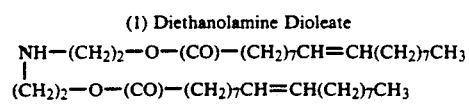

(2) Diethanolamine Dipalmitate

—continued

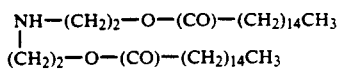

(3) Diethanolamine Oleate/palmitate

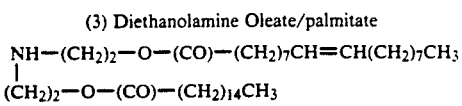

(4) Dipropanolamine Dimyristate

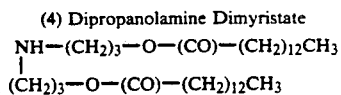

(5) Diethanolamine Distearate

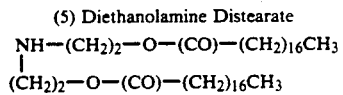

(6) Triethanolamine Trimyristate

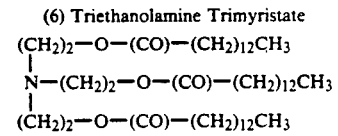

(7) Diethanolamine Di(lauryloxysuccinate)

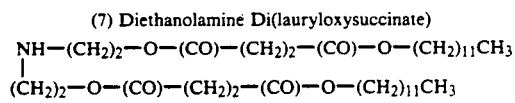

(8) Diethanolamine Di(5-oxanonanoate)

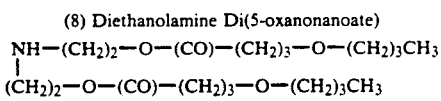

(9) Triethanolamine Tristearate

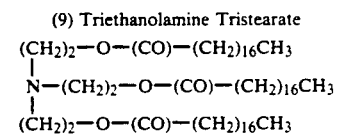

(10) Triethanolamine Distearate/Oleate

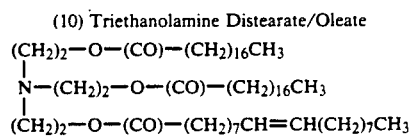

(11) Triethanolamine Trioleate

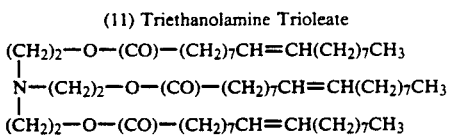

(12) Triethanolamine Trimyristate

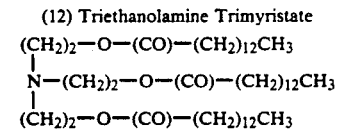

(13) Triethanolamine Trioleate

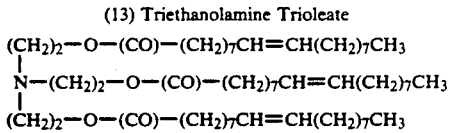

(14) Triethanolamine Dimyristate/Palmitate

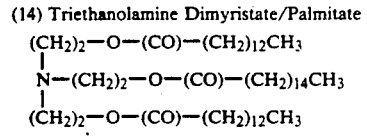

(15) N-Oleoyl-Diethanolamine Dimyristate

-continued (CO)—(CH$_2$)$_7$CH=CH(CH$_2$)$_7$CH$_3$
|
N—(CH$_2$)$_2$—O—(CO)—(CH$_2$)$_{12}$CH$_3$
|
(CH$_2$)$_2$—O—(CO)—(CH$_2$)$_{12}$CH$_3$

(16) Triethanolamine Tri-10-undecenate (CH$_2$)$_2$—O—(CO)—(CH$_2$)$_8$CH=CH$_2$
|
N—(CH$_2$)$_2$—O—(CO)—(CH$_2$)$_8$CH=CH$_2$
|
(CH$_2$)$_2$—O—(CO)—(CH$_2$)$_8$CH=CH$_2$

(17) Tripropanolamine Trilinoleate (CH$_2$)$_3$—O—(CO)—(CH$_2$)$_7$CH=CHCH$_2$CH=CH(CH$_2$)$_4$CH$_3$
|
N—(CH$_2$)$_3$—O—(CO)—(CH$_2$)$_7$CH=CHCH$_2$CH=CH(CH$_2$)$_4$CH$_3$
|
(CH$_2$)$_3$—O—(CO)—(CH$_2$)$_7$CH=CHCH$_2$CH=CH(CH$_2$)$_4$CH$_3$

(18) Tripropanolamine Trilaurate

CH$_2$CH(CH$_3$)—O—(CO)—(CH$_2$)$_{10}$CH$_3$
|
N—CH$_2$CH(CH$_3$)—O—(CO)—(CH$_2$)$_{10}$CH$_3$
|
CH$_2$CH(CH$_3$)—O—(CO)—(CH$_2$)$_{10}$CH$_3$

(19) N-Palmityloxyethyl-Dipropanolamine Dimyristate

CH$_2$CHCH$_3$—O—(CO)—(CH$_2$)$_{12}$CH$_3$
|
N—CH$_2$CH$_2$—O—(CH$_2$)$_{15}$CH$_3$
|
CH$_2$CHCH$_3$—O—(CO)—(CH$_2$)$_{12}$CH$_3$

(20) Triethanolamine Tri(benenyloxymalonate)

(CH$_2$)$_2$—O—(CO)—CH$_2$—(CO)—O—(CH$_2$)$_{21}$CH$_3$
|
N—(CH$_2$)$_2$—O—(CO)—CH$_2$—(CO)—O—(CH$_2$)$_{21}$CH$_3$
|
(CH$_2$)$_2$—O—(CO)—CH$_2$—(CO)—O—(CH$_2$)$_{21}$CH$_3$

(21) Triethanolamine Tributyryloxybutyrate (CH$_2$)$_2$—O—(CO)—(CH$_2$)$_3$—O—(CH$_2$)$_3$CH$_3$
|
N—(CH$_2$)$_2$—O—(CO)—(CH$_2$)$_3$—O—(CH$_2$)$_3$CH$_3$
|
(CH$_2$)$_2$—O—(CO)—(CH$_2$)$_3$—O—(CH$_2$)$_3$CH$_3$

(22) N-Palmityl-Diethanolamine Dipalmitate (CH$_2$)$_{15}$CH$_3$
|
N—(CH$_2$)$_2$—O—(CO)—(CH$_2$)$_{14}$CH$_3$
|
(CH$_2$)$_2$—O—(CO)—(CH$_2$)$_{14}$CH$_3$ B) Alcohol amine derivatives with one or two ester groups and one or two amide or amine groups having the general formula:

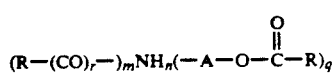

where
A is —(CH$_2$)$_2$—, —(CH$_2$)$_3$—, or —CH$_2$CH(CH$_3$)—
m = 1 to 2,
n = 0 to 1,
q = 1 to 2 (independently),
r = 0 to 1, and
each R is, independently, as defined above.
Example structures of this class of alcohol amine derivatives include

(23) N-Palmitoyl Ethanolamine Palmitate (CO)—(CH$_2$)$_{14}$CH$_3$
|
NH—(CH$_2$)$_2$—O—(CO)—(CH$_2$)$_{14}$CH$_3$ -continued

(24) N-Arachidoyl Ethanolamine Myristyloxymalonate (CO)—(CH$_2$)$_{18}$CH$_3$
|
NH—(CH$_2$)$_2$—O—(CO)—CH$_2$—(CO)—O—(CH$_2$)$_{13}$CH$_3$

(25) N-Stearyl Propanolamine Stearate (CH$_2$)$_{17}$CH$_3$
|
NH—(CH$_2$)$_3$—O—(CO)—(CH$_2$)$_{16}$CH$_3$

(26) N-Oleoyl Diethanolamine Dioleate (CO)—(CH$_2$)$_7$CH=CH(CH$_2$)$_7$CH$_3$
|
N—(CH$_2$)$_2$—O—(CO)—(CH$_2$)$_7$CH=CH(CH$_2$)$_7$CH$_3$
|
(CH$_2$)$_2$—O—(CO)—(CH$_2$)$_7$CH=CH(CH$_2$)$_7$CH$_3$

(27) N-Lauroyl Dipropanolamine Di(behenyloxypropanoate)

(CO)—(CH$_2$)$_{10}$CH$_3$
|
N—(CH$_2$)$_3$—O—(CO)—(CH$_2$)$_2$—O—(CH$_2$)$_{21}$CH$_3$
|
(CH$_2$)$_3$—O—(CO)—(CH$_2$)$_2$—O—(CH$_2$)$_{21}$CH$_3$

(28) N-Palmityl Dipropanolamine Dipalmitate (CH$_2$)$_{15}$CH$_3$
|
N—CH$_2$CH(CH$_3$)—O—(CO)—(CH$_2$)$_{14}$CH$_3$
|
CH$_2$CH(CH$_3$)—O—(CO)—(CH$_2$)$_{14}$CH$_3$

(29) N,N-Dimyristyl Ethanolamine Myristate (CH$_2$)$_{13}$CH$_3$
|
N—(CH$_2$)$_2$—O—(CO)—(CH$_2$)$_{12}$CH$_3$
|
(CH$_2$)$_{13}$CH$_3$

(30) N-Oleoyl Diethanolamine Dioleate (CO)—(CH$_2$)$_7$CH=CH(CH$_2$)$_7$CH$_3$
|
N—(CH$_2$)$_2$—O—(CO)—(CH$_2$)$_7$CH=CH(CH$_2$)$_7$CH$_3$
|
(CH$_2$)$_2$—O—(CO)—(CH$_2$)$_7$CH=CH(CH$_2$)$_7$CH$_3$

(31) N-Myristoyl Diethanolamine Dimyristate (CO)—(CH$_2$)$_{12}$CH$_3$
|
N—(CH$_2$)$_2$—O—(CO)—(CH$_2$)$_{12}$CH$_3$
|
(CH$_2$)$_2$—O—(CO)—(CH$_2$)$_{12}$CH$_3$

(32) N-Lauroyl Dipropanolamine Dilaurate (CO)—(CH$_2$)$_{10}$CH$_3$
|
N—(CH$_2$)$_3$—O—(CO)—(CH$_2$)$_{10}$CH$_3$
|
(CH$_2$)$_3$—O—(CO)—(CH$_2$)$_{10}$CH$_3$

(33) N,N-Dioleoyl Ethanolamine Oleate (CO)—(CH$_2$)$_7$CH=CH(CH$_2$)$_7$CH$_3$
|
N—(CH$_2$)$_2$—O—(CO)—(CH$_2$)$_7$CH=CH(CH$_2$)$_7$CH$_3$
|
(CO)—(CH$_2$)$_7$CH=CH(CH$_2$)$_7$CH$_3$

(34) N,N-Dilinoleoyl Ethanolamine Lauryloxysuccinate (CO)—(CH$_2$)$_7$CH=CHCH$_2$CH=CH(CH$_2$)$_4$CH$_3$
|
N—(CH$_2$)$_2$—O—(CO)—(CH$_2$)$_2$—(CO)—O—(CH$_2$)$_{11}$CH$_3$
|
(CO)—(CH$_2$)$_7$CH=CHCH$_2$CH=CH(CH$_2$)$_4$CH$_3$

EXAMPLES

The following examples are presented to further illustrate and explain the present invention and should not be taken as limiting in any regard. Unless otherwise indicated, all parts and percentages are by weight, and are based on the weight at the particular stage of the processing being described. The proton NMR spectra have assigned chemical shifts, multiplicities, and intensities consistent with the structures for which they are reported.

EXAMPLE 1

N,N,N-Tris(10-undecenoyloxyethyl)amine (also called triethanolamine tri-10-undecenate), an alcohol amine derivative of this invention, is synthesized in this example.

To a solution of triethanolamine (1.35 mL, 0.01 mole) in 30 mL pyridine is added 10-undecenoyl chloride (7 mL, ca. 0.033 mole), and the mixture is shaken overnight at room temperature. Filtration through silica, concentration on the rotary evaporator, and refiltration through silica affords an oil.

Proton NMR spectrum in chloroform-d: chemical shift in ppm (multiplicity, intensity, assignment): 5.79 (multiplet, H, HC=), 4.95 (multiplet, 6 H, =CH$_2$), 4.11 (triplet, 6 H, CH$_2$—O), 2.83 (triplet, 6 H, N—CH$_2$), 2.28 (triplet, 6 H, O$_2$C—CH$_2$), 2.02 (quartet, 6 H, CH$_2$—C=C), 1.60 (multiplet, 6 H, O$_2$C—CH$_2$) and 1.30 (multiplet, 30 H, CH$_2$).

EXAMPLE 2

N,N,N-Tris(oleoyloxyethyl) amine (also called triethanolamine trioleate) is prepared in this example.

To a solution of triethanolamine (1.35 mL, 0.01 mole) in 30 mL pyridine is added oleoyl chloride (11 mL, ca. 0.033 mole). The mixture is shaken overnight at room temperature. Filtration through silica, concentration, and refiltration through silica affords the title compound.

EXAMPLE 3

N,N,N-Tris(myristoyloxyethyl)amine (also called triethanolamine trimyristate), another alcohol amine ester of this invention, is synthesized in this example.

To a solution of triethanolamine (1.35 mL, 0.01 mole) in 30 mL pyridine is added myristoyl chloride (0.2 g, 0.033 mole), and the mixture is shaken overnight at room temperature. Filtration through silica, concentration and refiltration through silica affords the title compound.

EXAMPLE 4

This example outlines the preparation of a plastic alcohol amine ester derivative of this invention.

A mixture of 3.3 g oleoyl chloride (0.011 mole), 2.7 g myristoyl chloride (0.011 mole) and 3.0 g palmitoyl chloride (0.011 mole) in 30 mL pyridine is shaken with 1.35 mL (0.01 mole) triethanolamine overnight at 2° C. Filtration through silica, concentration and refiltration affords a plastic fat composition.

EXAMPLE 5

This example outlines the procedure for estimating the in vitro digestibility of the alcohol amine ester derivatives of this invention using pancreatic lipase.

Preparation of Reagents and Materials

1. Buffer: A pH 7.1 phosphate buffer is prepared by dissolving 6.8 g. KH$_2$PO$_4$ in 1 L. of millipore filtered water (to yield 0.05M phosphate). Fifty mg. Ca(NO$_3$)$_2$ and 5.0 g. cholic acid (Na salt, an ox bile isolate from Sigma) are added to give 0.3 mM Ca$^{++}$ and 0.5% cholic acid in 0.05M phosphate. The pH is adjusted to approximately 7.1 with solid NaOH. Several drops of Baker "Resi-analyzed" toluene are added to prevent bacterial growth during storage at 3°–5° C.

2. Lipase: About 15 mg/mL commercial porcine pancreatic lipase from U.S. Biochemical Corporation is dissolved in buffer.

3. Substrates and Standards: A 1.0 mL volumetric flask is charged with an amount of lipid substrate (test substance or standard) calculated to give a concentration of 200 nanomoles per microliter in Baker "Resi-analyzed" toluene. (The proper concentration may be approximated by doubling the molecular weight of the lipid in question, dividing by 10, and diluting to the mark; this yields about 200 nanomoles per microliter.) This preparation affords the substrate to be used in the hydrolysis reactions.

Fatty acids and glyceride standards from Nu Chek or Sigma are prepared for elution on TLC plates (prewashed with 1:1 chloroform/methanol) by diluting the substrate solution with 10:1 toluene (1 part substrate plus 9 parts toluene by volume) in septum vials.

Procedure

In a 25 mL Erlenmeyer, emulsify 20 mL buffer and 40 microliters of substrate using an ultrasonic disrupter at a microtip maximum setting for approximately 10 seconds. This results in a 0.4 microliter/milliliter emulsion. Place in a 37° C. water bath and stir vigorously. After temperature equilibration, add 40 microliters of enzyme solution and start timing. Remove 5.0 mL aliquots at convenient time intervals for analysis. To establish a standard curve for triolein, aliquots are taken at 10, 20, 30 and 40 minutes. A zero time control should be run for all test compounds.

Add the aliquot to a 15 mL glass centrifuge tube containing a drop of concentrated HCl. Add approximately 3 mL of a 2:1 mixture of CHCl$_3$:CH$_3$OH and shake vigorously. Centrifuge at approximately 5000 rpm for 5 minutes and transfer the bottom layer with a Pasteur pipet to a 5 mL septum vial. Repeat the extraction step once and combine the two bottom layers. Evaporate the solvent in nitrogen gas. After about half of the solvent is removed, add an equivalent volume absolute ethanol and continue evaporation in a nitrogen stream until dryness is achieved. Samples may be warmed with a heat gun to facilitate drying.

When the samples are dry, add exactly 200 microliters of toluene containing 10% DMSO, cap tightly, and spot TLC plate with 2.0 microliters per channel. (If 100% extraction efficiency of a zero time control is achieved, this amounts to 20 nanomoles of substrate spotted on the plate.) Develop with a suitable solvent system, for example, hexane: ethyl ether: chloroform: acetic acid in a volume ratio of 60:20:20:1. After 15 cm elution, dry plate with a heat gun and determine amounts of starting substrate and products of hydrolysis by scanning 10 to 20 nanomoles per channel at a wavelength of 190 nm using the CAMAG TLC Scanner II densitometer equipped with a Spectra Physics 4270 integrator and comparing with controls run at the same time. Results Using this procedure with a triglyceride control, triolein is substantially hydrolyzed in 10 minutes with this enzyme system. Using the same procedure, triethanolamine tri-10-undecenate synthesized in Example 1 is hydrolyzed approximately 20% after three hours contact with pancreatic lipase.

EXAMPLE 6

Sweet Chocolate. A low calorie sweet chocolate may be prepared by combining:

| Ingredient | parts |
|---|---|
| Cocoa Powder | 1.0 |
| Sugar | 1.0 |

To this is added a portion of

| | |
|---|---|
| Example 3 Alkanolamine Ester | 1.0 | and the ingredients are mixed thoroughly and passed through a refiner to reduce the particles to desired size. The material is conched, and the remaining triethanolamine trimyristate is added. The mixture is poured into molds and quench cooled. No tempering regimen is necessary.

Chocolate Chips. The chocolate prepared above may be melted and deposited into nibs in the usual process.

EXAMPLE 7

Sugar Cookies. Sugar cookies may be prepared by blending:

| Ingredient | parts |
|---|---|
| Sugar | 231 |
| Example 1 Alkanolamine Ester | 114 |
| Salt | 3.7 |
| Sodium Bicarbonate | 4.4 |
| Water | 37.4 |
| 5.9% Dextrose Solution (wt/wt) | 58.7 |
| Flour | 391 |

All of the ingredients are creamed together. The dough so formed may be extruded and baked by the usual process.

EXAMPLE 8

Margarine. Margarine may be prepared by combining the ingredients for the following two phases:

| | parts |
|---|---|
| Oil Phase Ingredients | |
| Example 2 Alkanolamine Ester | 59.0 |
| Soybean Hardstock (IV 65) | 40.0 |
| Emulsifier | 1.0 |
| Aqueous Phase Ingredients | |
| Water | 95.8 |
| Milk Solids | 2.0 |
| Salt | 2.0 |
| Citric Acid | 0.1 |
| Beta Carotene | 0.1 |

The phases are emulsified in an oil:aqueous phase ratio of 80:20, and passed through a cool scraped surface heat exchanger in the usual process.

EXAMPLE 9

Flavor Bits. Flavor bits for incorporation into baked goods may be prepared by combining the following ingredients:

| Ingredient | parts |
|---|---|
| Sucrose | 215 |
| Water | 180 |
| Corn Syrup | 160 |
| Example 8 Margarine | 28 |
| Flavor | 12 |
| Citric Acid | 10 |
| Glycerine | 8 |
| Salt | 5 |
| Dye | 1 |

The first three ingredients are heated to 290° F. and the heat removed. Margarine is mixed in, and the mixture allowed to cool to 160°-170° F. before adding the remaining ingredients. (Almost any flavoring material may be used as flavor, for example, butterscotch or nut.) The mixture is then poured into a cold aluminum pan and frozen in dry ice. The frozen mixture is then cracked and milled into bits.

EXAMPLE 10

Butterscotch Cookies. Butterscotch cookies may be prepared by blending:

| Ingredient | parts |
|---|---|
| Flour | 22.0 |
| Example 4 Alkanolamine Ester | 20.0 |
| Salt | 0.7 |
| Sodium Bicarbonate | 0.1 |
| Monocalcium Phosphate | 0.1 |
| Vanillin | 0.1 |
| Water | 8.0 | and mixing well. To this is added

| | |
|---|---|
| Sugar | 30.0 | which is mixed until dispersed. Then

| | |
|---|---|
| Example 9 Butterscotch Bits | 19.0 | are added and mixed until just blended prior to depositing and baking by the usual process.

EXAMPLE 11

Vanilla Wafers. Combine and mix well:

| Ingredient | parts |
|---|---|
| Flour | 40 |
| Sugar (10X) | 28 |
| Example 4 Alkanolamine Ester | 13 |
| Frozen Whole Eggs | 6.0 |
| High Fructose Corn Syrup | 4.0 |
| Salt | 0.7 |
| Vanilla | 0.3 |
| Sodium Bicarbonate | 0.3 |
| Sodium Aluminum Phosphate | 0.1 |
| Ammonium Bicarbonate | 0.1 |
| Water | 7.5 |

Aerate, deposit onto a baking surface and bake in the usual manner

EXAMPLE 12

Chocolate Chip Cookies. Chocolate chip cookies may be prepared using the butterscotch cookie recipe of Example 10, but substituting

| Ingredient | parts |
|---|---|
| Example 8 Margarine | 10.0 |
| Example 4 Alkanolamine Ester | 10.0 | for the fat mimetic ingredient,

| Granulated Sugar | 15.0 |
|---|---|
| Brown Sugar | 15.0 | for the sugar, and

| Example 6 Chocolate Chips | 19.0 |
|---|---| for the butterscotch bits.

EXAMPLE 13

Filled Cream. To make a "filled cream" composition, homogenize about

| Ingredient | parts |
|---|---|
| Example 2 Alkanolamine Ester | 30 |
| Skim Milk | 82 |
| Polysorbate 80 | 0.1 | in a conventional dairy homogenizer

EXAMPLE 14

Ice Cream. Vanilla ice cream may be prepared by mixing

| Ingredient | parts |
|---|---|
| Sugar (10X) | 15.0 |
| Nonfat Dry Milk | 3.9 |
| Salt | 0.4 |
| into Water | 39.0 | for 3 minutes. Then add melted

| Example 3 Alkanolamine Ester | 28.4 |
|---|---| and cook to 200° F. while mixing. Hold for 1 minute. Cool to 160° F., and add

| Sugared Egg Yolks | 12.5 |
|---|---|
| Vanilla Extract | 0.8 | and mix 1 minute. Cool and freeze to desired overrun.

EXAMPLE 15

Filled Milk. To prepare a "filled milk" composition, combine about

| Ingredient | parts |
|---|---|
| Example 13 Filled Cream | 100 |
| Skim Milk | 900 | and rehomogenize.

EXAMPLE 16

Cheese Products. To prepare cheese products, treat

| Ingredient |
|---|
| Example 15 Filled Milk | made with a 1:1 mixture of Examples 1 and 4 alkanolamine esters is used like natural milk in the normal cheese making process (as is practiced, for example in the production of Cheddar or Swiss cheese). Preferably add

| | parts |
|---|---|
| Butter Oil | 10 | to the fat mimetic portion of the filled milk product before it is employed in this process to enhance the proper flavor development of the cheese products.

EXAMPLE 17

Butter Cream Frosting. Butter cream frosting may be prepared by blending:

| Ingredient | parts |
|---|---|
| Sugar | 227.0 |
| Example 1 Alkanolamine Ester | 70.8 |
| Water | 28.4 |
| Nonfat Dry Milk | 14.0 |
| Emulsifier | 1.4 |
| Salt | 1.0 |
| Vanilla | 1.0 |

All of the ingredients are creamed in a mixer at medium speed.

EXAMPLE 18

Crackers. A dough prepared by mixing together

| Ingredient | parts |
|---|---|
| Flour | 100 |
| Sugar | 5.0 |
| Malt | 1.5 |
| Example 2 Alkanolamine Ester | 7.5 |
| Salt | 1.0 |
| Sodium Bicarbonate | 0.9 |
| Nonfat Dry Milk | 2.5 |
| High Fructose Corn Syrup | 2.5 |
| Monocalcium Phosphate | 0.75 |
| Water | 28 | is sheeted, stamped, and baked to produce a cracker product.

EXAMPLE 19

Sprayed Crackers. The sheeted and stamped cracker dough of Example 18 may be sprayed with the alkanolamine ester of Example 1 after baking.

EXAMPLE 20

Mayonnaise. Mayonnaise can be prepared from the following formulation:

| Ingredient | parts |
| --- | --- |
| Example 2 Alkanolamine Ester | 40 |
| Corn Oil | 40 |
| Egg yolk | 5.5 |
| Vinegar | 3.0 |
| Salt | 1.5 |
| Sugar | 2.0 |
| Flavor | 0.5 |
| Water | 7.5 |

The egg yolk is first mixed with the other dry ingredients and a small amount of the water and vinegar in a container. The alkanolamine ester and oil are then slowly poured into the container, while subjecting the container contents to mixing, to form an emulsion. While continuing to agitate the emulsion, the remaining water and vinegar are added.

EXAMPLE 21

Pudding. Pudding can be prepared from the following formulation:

| Ingredient | parts |
| --- | --- |
| Milk | 67 |
| Sugar | 11 |
| Starch | 5 |
| Water | 9 |
| Flavor | 3 |
| Example 1 Alkanolamine Ester | 5 |

The ingredients can be blended together and heated to form a pudding.

EXAMPLE 22

Frying Oil. The alkanolamine ester of Example 3 with 1 ppm polydimethylsiloxane may be used for frying food snacks. For frying potatoes, omit the polydimethylsiloxane.

EXAMPLE 23

Frying Oil. Another frying oil may be prepared by combining 1 part frying oil of Example 22 with 1 part peanut oil. As in Example 22, 1 ppm of polydimethylsiloxane may be added for frying food snacks other than potatoes.

EXAMPLE 24

Pet Food. Dry, expanded animal food kibs may be prepared from the following ingredients:

| Ingredient | parts |
| --- | --- |
| Hominy Feed | 37 |
| 52% Meat Meal | 17 |
| Wheat Shorts | 13 |
| Example 1 Alkanolamine Ester | 16 |
| Corn Germ Meal | 9.6 |
| Wheat Germ Meal | 3 |
| Dried Milk | 0.9 |
| Beet Pulp | 1.7 |
| Fish Scrap | 0.5 |
| Brewer's Yeast | 0.5 |
| Salt | 0.5 |
| Vitamins and Minerals | 0.1 |

The ingredients are mixed together and water added to raise the water content to 27%, before extrusion, pelleting, and drying in the usual manner.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims.

What is claimed is:

1. In a food composition having a digestible fat ingredient, an improvement wherein at least a portion of said digestible fat ingredient is replaced by a fat mimetic compound of the following formula:

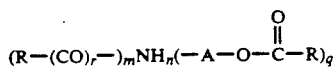

where

A is $-(CH_2)_2-$, $-(CH_2)_3-$, or $-CH_2CH(CH_3)-$, m = 0 to 2, n = 0 to 1, q = 1 to 3, with the proviso the $m+q \geq 2$ each r = 0 to 1 independently, and each R is, independently, a $C_1$ to $C_{29}$ aliphatic group, a $C_2$ to $C_{29}$ ether group of the formula $R'-O-R''-$, or a $C_2$ to $C_{29}$ ester group of the formula

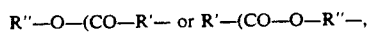

where $R'-$ and $R''-$ are, independently, aliphatic groups,

2. An improvement according to claim 1 wherein said compound has $m+q=3$ and $n=0$.

3. An improvement according to claim 1 wherein said compound has $m=n=0$ and $q=3$.

4. An improvement according to claim 3 wherein the R groups of said compound are aliphatic having 3 to 23 carbon atoms.

5. An improvement according to claim 1 wherein said compound has R groups derived from fatty acids selected from the group consisting of butyric, caproic, caprylic, pelargonic, capric, undecanoic, lauric, myristic, palmitic, stearic, arachidic, behenic, oleic, linoleic, linolenic, eleostearic, and arachidonic acid derivatives, and mixtures thereof.

6. An improvement according to claim 1 wherein said compound has R groups derived from non-hydrogenated, partially hydrogenated or fully hydrogenated oils selected from the group consisting of sunflower, safflower, soybean, olive, rice bran, canola, babassu, coconut, palm kernel, palm, peanut, sesame, cottonseed, corn, butter, and marine oils, and fractions thereof.

7. An improvement according to claim 1 wherein said compound has an R that is an ether group of the formula $R''-O-R''-$, wherein R' and R'' are aliphatic groups having a total of 2 to 29 carbon atoms.

8. An edible composition, comprising in addition to other edible ingredients, a fat mimetic of the following formula:

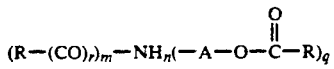

where
A is —(CH₂)₂—, —(CH₂)₃—, or —CH₂CH(CH₃)—,
m = 0 to 2,
n = 0 to 1,
q = 1 to 3,
with the proviso the m + q ≧ 2
each r = 0 to 1 independently, and
each R is, independently, an ester group of the formula

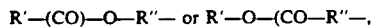

wherein R' and R" are aliphatic groups having a total of 2 to 29 carbon atoms.

9. An edible composition comprising, in addition to other edible ingredients, a fat compound comprising a N-alkyl or N-acyl derivative of an alkanolamine selected from the group consisting of diethanolamine and dipropanolamine fatty acid diesters.

10. The composition according to claim 9 wherein said compound has a N-alkyl or N-acyl group; of 1 to 29 carbons and ester groups of 2 to 30 carbons.

11. An edible composition comprising, in addition to other edible ingredients, a fat compound comprising the N-dialkyl or N-diacyl derivatives of an alkanolamine selected from the group consisting of ethanolamine and propanolamine fatty acid esters.

12. The composition according to claim 11 wherein said compound has N-dialkyl and N-diacyl groups of 1 to 29 carbons and ester groups of 2 to 30 carbons.

13. A method of preparing a fat-containing edible composition comprising formulating said composition with the fatty acid triesters of alkanolamines selected from the group consisting of triethanolamine and tripropanolamine in full or partial replacement of said fat.

14. A method according to claim 13 wherein the fatty acid triesters comprise $C_4$ to $C_{24}$ fatty acid triesters.

15. A composition according to any one of claims 9 to 12 wherein said compounds have alkyl, acyl and ester groups derived from fatty acids selected from the group consisting of butyric, caproic, caprylic, pelargonic, capric, undecanoic, lauric, myristic, palmitic, stearic, arachidic, behenic, oleic, linoleic, linolenic, eleostearic, and arachidonic acid, and mixtures thereof.

16. A composition according to any one of claims 9 to 12 wherein said compounds have alkyl, acyl and ester groups derived from non-hydrogenated, partially hydrogenated or fully hydrogenated oils selected from the group consisting of sunflower, safflower, soybean, olive, rice bran, canola, babassu, coconut, palm kernel, palm, peanut, sesame, cottonseed, corn, butter, and marine oils, and fractions thereof.

17. A method of preparing a fat-containing edible composition comprising the incorporation of a fat mimetic compound of the following formula:

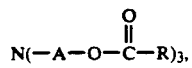

where
A is —(CH₂)₂—, —(CH₂)₃— or —(CH₂CH(CH₃)—, and
each R is, independently, a $C_1$ to $C_{29}$ aliphatic group, a $C_1$ to $C_{29}$ ether group of the formula R'—O—R"—, or a $C_2$ to $C_{29}$ ester group of the formula R"—O—(CO)—R'— or R'—(CO,—O—R"—, where R'— and R"— are, independently, aliphatic groups in full or partial replacement of said fat.

18. A method of preparing a fat-containing edible composition comprising incorporating a fat mimetic compound of the following formula:

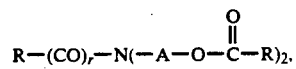

where
A is —(CH₂)₂—, —(CH₂)₃— or —(CH₂CH(CH₃)—,
r = 0 to 1, and
each R is, independently, a $C_1$ to $C_{29}$ aliphatic group, a $C_2$ to $C_{29}$ ether group of the formula R'—O—R"—, or a $C_2$ to $C_{29}$ ester group of the formula R"—O—(CO—R'— or R'—(CO)—O—R"—, where R'— and R"— are, independently, aliphatic groups in full or partial replacement of said fat.

19. A method of preparing a fat-containing composition comprising incorporation a fat mimetic compound of the following formula:

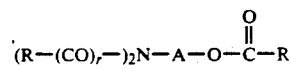

where
A is —(CH₂)₂—, —(CH₂)₃—, or —CH₂CHCH₃—,
r = 0 or 1, and
each R is, independently, a $C_1$ to $C_{29}$ aliphatic group, a $C_2$ to $C_{29}$ ether group of the formula R'—O—R"—, or a $C_2$ to $C_{29}$ ester group of the formula , R"—O—(CO)—R'— or R'—(CO)—O—R"—, wherein R'— and R"— are, independently, aliphatic groups in full or partial replacement of said fat.

20. The method according to any one of claims 17 to 19 wherein said compounds have R groups derived from fatty acid derivatives selected from the group consisting of butyric, caproic, caprylic, pelargonic, capric, undecanoic, lauric, myristic, palmitic, stearic, arachidic, behenic, oleic, linoleic, linolenic, eleostearic, and arachidonic acid derivatives, and mixtures thereof.

21. The method according to any one of claims 17 to 19 wherein the compounds have R groups derived from oils selected from the group consisting of non-hydrogenated, partially hydrogenated or hydrogenated sunflower, safflower soybean, olive, rice bran, canola, babassu, coconut, palm kernel, palm, peanut, sesame, cottonseed, corn, butter, and marine oils, and fractions thereof.

22. A method for reducing the available calories in a food composition having an edible fat component, which method consists of replacing at least a portion of the edible fat with a compound of the following formula

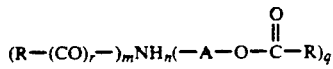

where

A is —(CH$_2$)$_2$—, —(CH$_2$)$_3$—, or —CH$_2$CHCH$_3$—, m = 0 to 2, n = 0 to 1, q = 1 to 3 independently, with the proviso that m + q ≥ 2, r = 0 to 1 independently, and each R is, independently, a C$_1$ to C$_{29}$ aliphatic group, a C$_2$ to C$_{29}$ ether group of the formula R'—O—R''—, or a C$_2$ to C$_{29}$ ester group of the formula

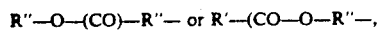

R''—O—(CO)—R'— or R'—(CO)—O—R''—, where R'— and R''— are, independently, aliphatic groups.

23. The method of claim 22 wherein said compound has n = 0, and m + q = 3.

24. The method according to claim 22 wherein each group is, independently, an aliphatic group having 3 to 23 carbons.

25. The method according to claim 24 wherein said compound has n = 0, r = 0, q = 3, and each R group has 13 to 17 carbon atoms.

26. The method according to claim 22 wherein said compound is partially digestible.

27. An edible food composition comprising, in addition to other ingredients, a fat mimetic compound of the following formula

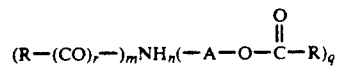

where

A is —(CH$_2$)$_2$—, —(CH$_2$)$_3$—, or —CH$_2$CHCH$_3$—, m = 1 to 2, n = 0 to 1, q = 1 to 2 independently, r = 0 to 1 independently, and each R is, independently, a C$_1$ to C$_{29}$ aliphatic group, a C$_2$ to C$_{29}$ ether group of the formula R'—O—R''—, or a C$_2$ to C$_{29}$ ester group of the formula

R''—O—(CO)—R'— or R'—(CO)—O—R''—, where R'— and R''— are, independently, aliphatic groups.

28. The composition according to claim 27 wherein said fat mimetic has n = 0 and m + q = 3.

29. The composition of claim 27 wherein the fat mimetic compound is partially digestible.

30. The composition of claim 27 wherein said food composition is selected from the group consisting of salad dressings, dairy products, frying fats and oils, bakery products, frostings and fillings, candy, and meat substitutes or extenders.

31. The method according to claim 22 wherein said food composition is a bakery product.

32. The method according to claim 31 wherein said bakery product is a cookie further comprising sugar and flour.

33. The method according to claim 31 wherein said bakery product is a cracker further comprising flour.

34. The method according to claim 22 wherein said food composition is a filled dairy product.

35. The method according to claim 34 wherein said filled dairy product further comprises skim milk.

36. The method according to claim 22 wherein said food composition is mayonnaise further comprising egg, vinegar, salt, and water.

37. The method according to claim 22 wherein said food composition is a pudding further comprising milk.

38. The method according to claim 22 wherein said food composition is chocolate further comprising cocoa powder and sugar.

39. The method according to claim 22 wherein said food composition is a margarine further comprising emulsifier, and water.

40. The method according to claim 22 wherein said food composition is a frying oil.

41. The method according to claim 40 wherein said frying oil further comprises another ingredient selected from the group consisting of polydimethylsiloxane and peanut oil.

42. The method according to claim 22 wherein said food composition is a frosting further comprising sugar and water.

43. The method according to claim 22 wherein said food composition is a pet food further comprising meat meal, wheat shorts, corn germ meal, wheat germ meal, dried milk, beet pulp, brewer's yeast, salt, vitamins and minerals.

44. In a food composition having a digestible fat ingredient, an improvement wherein at least a portion of the digestible fat ingredient is replaced by a fatty acid triester of an alkanolamine selected from the group consisting of triethanolamine and tripropanolamine to produce a reduced calorie product.

45. The improvement of claim 44 wherein said fatty acid triesters comprise C$_4$ to C$_{24}$ triesters.

46. An edible composition comprising, in addition to other edible ingredients, a fat mimetic comprising the C$_1$ to C$_{29}$ N-alkylated or N-acylated fatty acid diesters of alkanolamines selected from the group consisting of diethanolamine and dipropanolamine.

47. The composition according to claim 46 wherein said diesters comprise C$_4$ to C$_{24}$ diesters.

* * * * *

UNITED STATES PATENT AND TRADEMARK OFFICE
CERTIFICATE OF CORRECTION

PATENT NO. : 5,093,142
DATED : Mar. 3, 1992
INVENTOR(S) : Lawrence P. Klemann, et al It is certified that error appears in the above-indentified patent and that said Letters Patent is hereby corrected as shown below:

On title page, item [75] Inventors: "Lawrence P. Klemann, Somerville; John W. Finley, Whippany; Anthony Scimone, Cedar Grove, all of N.J." should read --Lawrence P. Klemann, Somerville; John W. Finley, Whippany; Anthony Scimone, Cedar Grove; Ronald G. Yarger, Convent Station, all of N.J.--

Signed and Sealed this

Seventeenth Day of May, 1994

Attest:

BRUCE LEHMAN

*Attesting Officer*    *Commissioner of Patents and Trademarks*